(No Model.)
C. F. BRUSH.
PROCESS OF FORMING ELECTRODES FOR SECONDARY BATTERIES.
No. 286,259. Patented Oct. 9, 1883.
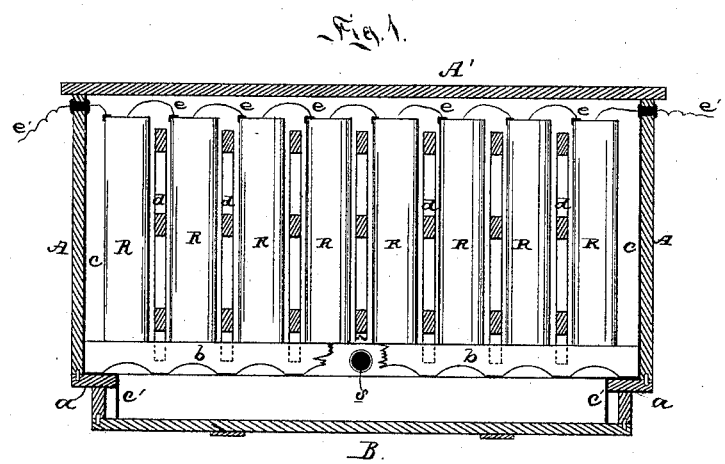
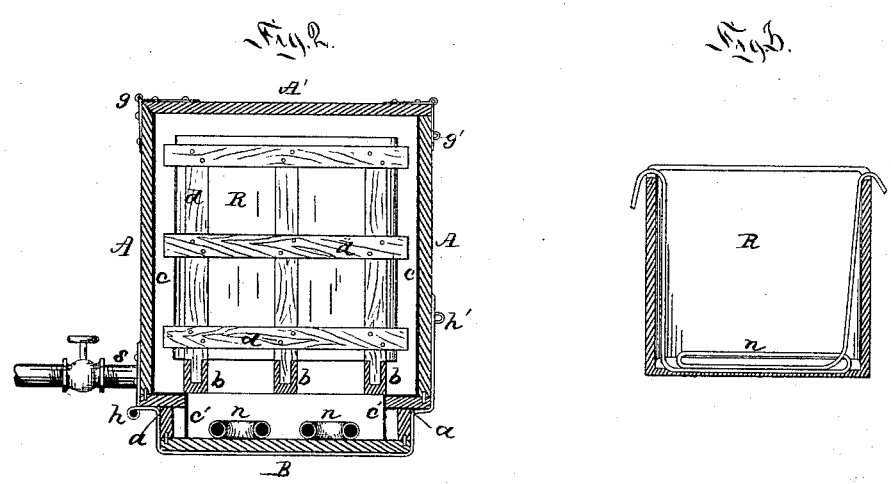

UNITED STATES PATENT OFFICE.

CHARLES F. BRUSH, OF CLEVELAND, OHIO.

PROCESS OF FORMING ELECTRODES FOR SECONDARY BATTERIES.

SPECIFICATION forming part of Letters Patent No. 286,259, dated October 9, 1883.

Application filed September 3, 1883. (No model.)

*To all whom it may concern:*

Be it known that I, CHARLES F. BRUSH, of Cleveland, in the county of Cuyahoga and State of Ohio, have invented certain new and useful Improvements in the Process of Forming Electrodes or Elements for Secondary Batteries; and I do hereby declare the following to be a full, clear, and exact description of the invention, such as will enable others skilled in the art to which it pertains to make and use the same.

Figure 1 is a longitudinal vertical section of an apparatus illustrative of my present invention. Fig. 2 is a transverse vertical section thereof, and Fig. 3 shows a modification of the heating apparatus.

My present invention relates to certain improvements in the "forming," as it is technically termed, of electrodes, elements, or plates for use in secondary batteries; and the nature of it consists, chiefly, and in general terms, in a process or method of operation wherein the lead plate or other form of battery element is alternately heated and cooled after and during or in the intervals of an electro-chemical charging action, substantially as hereinafter set forth and claimed.

The use of lead plates, frames, diaphragms, &c., of various shapes and constructions, whereon to "form" a peroxide coating is already to a certain extent known in the art, and various processes have been described and patented relative to such forming operations. So much of such forming operation as results from the passage of an electric current through the battery from any suitable electric generator with reference to the production of such peroxide is commonly known in the art as "charging," and it will be designated by that term herein; and, as regards this charging operation, any suitable means, apparatus, or process adapted to electro-chemically produce a peroxide surface on the electrode or element may be employed, and such operations are now so well understood in the art that I do not deem it necessary to describe them or any of them in detail; but, in so far as further description may be desirable or important, I would refer to the method or process of charging which is described in Letters Patent No. 264,211, granted to me September 12, 1882, as one which in the working of the present invention gives good results, and as the one which I now prefer to use. So, also, as regards the lead plate or other battery element employed, I prefer the use of cast-lead plates substantially such as are described in Letters Patent No. 266,090, granted to me October 17, 1882, but without limitation as to their form or other characteristic feature or peculiarity. Sheet, rolled, or wrought lead may be employed, or lead in granulated or spongy or porous or other suitable form; but cast-lead is preferred. The lead element adopted being placed in a forming cell or battery and properly associated with a counter-electrode, acid bath, &c., is charged in any suitable way continuously or intermittently a greater or less length of time, or till the electro-chemical action of the charging-current shall have produced a considerable coating of peroxide, or such or about such a coating as can be economically produced in that way and under such conditions. Such coating is formed rapidly at first, and more slowly as the work goes on, and hence the point at which it may be best arrested preliminary to the next step of the process may be left largely to the discretion of the skilled operator; but preferably as a heavy coating should be made as can be secured advantageously or with due regard to economy. Then the lead element still in its cell, but with the charging current cut off, or suspended, or weakened, if previously heavy, is heated in any suitable or desired way to a temperature of about 200° or 212° Fahrenheit, more or less, though some benefit will follow from an elevation of temperature much less than that thus indicated. The battery element or elements thus heated are preferably kept at or approximately at the temperature thus indicated for a few hours—say for a period of about six or eight hours—though beneficial results will follow even if the plates be allowed to cool in a less time, or even if allowed to cool down immediately after heating. Care should be taken that they are not kept at a high temperature so long as to produce any material peeling or loosening of the peroxide or other injurious results, and within this limit the length of such time may be varied at pleasure. Next the battery element or elements are allowed to cool down, or are by artificial means cooled down by preference to or nearly to or even below atmospheric temperature, and are then again subjected to the action of the charging-current. One such series of operations—that is, heating, (after the primary charging,) cooling, and recharging—will give a beneficial result by increasing the thickness of the peroxide coating to a much greater extent than would be possible by a continuation of the primary charging operation during the same length of time; but it will be better to repeat the process one or more times—that is, by again heating, cooling, and recharging, and so on with these operations following each other in regular orderly succession until the desired thickness or depth of peroxide coating is obtained.

As already stated, any suitable apparatus or means may be employed in the heating operation above described, and also for cooling; but in the accompanying drawings I have shown one which I have found to be suitable for the purpose, and one which I include herein as a part of the present invention.

In the drawings, A represents a box, case, or retort of any desired size or capacity, and provided with a cover or lid, A', either removable or secured by hinge $g$ and key $g'$. The lower edges of the sides and ends are flared inward, as at $a$, and immediately beneath these flanges a pan-shaped bottom, B, is secured by bolts or by hinges $h$ and keys $h'$, and the lead lining $c$ of the box has a downward flange, $c'$, to make a seal or water trap. The box is provided with any suitable seats or supports, $b$, of insulating material, and the battery-cells R, with the lead plates, acid, &c., therein, are arranged side by side on such supports, but out of contact with the sides of the box, and kept from coming in contact with each other by means of interposed racks $d$, also of insulating material; and in order that the charging, heating, and cooling may be done without the necessary removal of the cells R from and back to the box A, I provide for charging by coupling up the positive and negative electrodes by wires or other suitable conductors, $e\ e$, and connect the circuit-charging terminal wires $e'$ therewith in any suitable way.

In order to do the heating as described, I make use of free steam and admit the same at the proper times directly or indirectly from any suitable steam-generator by a suitable pipe entering at any desired point, as at $s$.

In operation with an apparatus thus constructed, the cells, with their plates, &c., properly arranged and coupled and placed on the insulating-supports, are charged until peroxidized, as may be desired. The charging-current is then cut off or stopped, or (as may be done) so far weakened that practically it will be inoperative as regards any rapid peroxidizing action or result, and then steam is turned on through the port $s$. The steam passes freely all around and between the cells R, and at first is condensed somewhat rapidly, so that the water of condensation, accumulating in the pan-shaped bottom B, forms a seal or water trap around the lower edges of the flange $c'$, and if the bottom pan becomes full the excess flows out at the joint of the bottom pan, B, and box A. The steam heats up the cells and their contents to about the temperature specified. As soon as this is done, or after a few hours, as above stated, the steam is shut off, the bottom B is removed (if bolted) or dropped down, (if hinged,) and the lid or cover A' is raised, so that external air may pass freely up around and between the cells, and so cool them down rapidly. I consider that rapid cooling is desirable, and hence artificial means of refrigeration of any known or suitable construction may be added. As soon as the cooling is done the battery element may be again charged, and if further treatment is desired the box should be reclosed and the battery elements be again heated, cooled, and charged, and so on as often as may be desired.

In this description I have assumed that the cells R are made, as I commonly make them, of lead, and in such case I so couple them with the battery element or elements therein that they shall constitute the counter-electrode; but with other forms or kinds of cells the arrangement of the elements and the coupling should be suitably changed.

I have described the plates or electrodes or battery elements as remaining in their cells during all the operations described; but while charging must of course be done under such conditions, it is also true that for heating and cooling purposes they may be removed from their cells, placed in a suitable box, retort, or chamber, and heated by steam in the manner set forth; and in this connection steam is especially beneficial, since it has the capacity of keeping the plates moist while being heated or kept in a heated state; but when the plates are thus treated while in the acid of the cells, hot air or other hot fluid, or other manner of applying heat, may be used; or, instead of using free steam, the steam or other hot fluid may be passed through a coil or coils of pipe arranged in the box, as at $n$, Fig. 2, or even in the cells themselves, as in Fig. 3. Such of the plates thus treated or "formed" as are intended to be used as the negative or hydrogen elements of a secondary battery are of course to be subsequently treated by an electric current in a reverse direction, so as to reduce the oxide to a metallic sponge, as is well understood in the art. In such case recharging after the last cooling may be unnecessary; also, without departing from the present invention, other steps or features of secondary battery "formation" may be added or interjected, as desired, such as discharging the battery, reversing the current, &c.

While I have described the operations of primary charging, heating, cooling, and recharging as going on or being performed separately and in orderly succession, and while I believe that to be the best manner of working the invention, and for that reason have so described it, the process may in some respects be modified without any material departure from the scope of the invention—as, for example, the recharging current may be allowed to act during all or a portion of the time occupied in heating and cooling, provided such current be so weak, or, if previously strong, be so weakened, that its peroxidizing effect is inappreciable, or even slow as distinguished from rapid, for I have found that a rapid peroxidizing action during the heating and cooling operations tends to defeat the object in view; or the recharging operation may lap somewhat onto the cooling or onto the heating when the latter is prolonged, so that recharging may begin at an earlier stage of the operation, thus economizing time, if found desirable.

For the purpose of distinguishing this case from other cases filed by me for similar inventions, I shall designate this case as "Case W."

I claim herein as my invention—

1. In the operation of forming plates, elements, or electrodes for secondary-battery use, and as preparatory to further treatment by recharging or reversal of the current, the described process of treatment, which consists in successively charging, heating, and cooling the same, substantially as set forth.

2. The process of forming plates, elements, or electrodes for secondary-battery use by successively charging, heating, and cooling the same and recharging, substantially as set forth.

3. The method of forming plates, elements, or electrodes for secondary-battery use by repeatedly charging, heating, and cooling the same in regular succession, and finally recharging, substantially as set forth.

4. As a step in the process of forming plates, electrodes, or elements for secondary-battery use, heating and cooling the same after the action of a peroxidizing-current, substantially as set forth.

5. As an apparatus for the forming of elements for secondary-battery use, a box, case, or retort having, in combination, means for alternately heating and cooling the elements while contained in their cells, suitable supports of insulating material for receiving the cells, and charging-circuit terminals through which to charge and recharge the elements without the necessary removal thereof from their cells, substantially as set forth.

In testimony whereof I sign this specification, in the presence of two witnesses, this 14th day of July, 1883.

CHARLES F. BRUSH.

Witnesses:
 ALBERT E. LYNCH,
 N. S. POSSONS.